United States Patent [19]

Troy

[11] 4,240,363
[45] Dec. 23, 1980

[54] INCINERATOR BAG

[76] Inventor: Stephen R. Troy, 717 Cottonwood Dr., Severna Park, Md. 21146

[21] Appl. No.: 63,873

[22] Filed: Aug. 3, 1979

[51] Int. Cl.³ .................................. F23G 9/00
[52] U.S. Cl. ........................... 110/241; 44/40; 229/54 R; 229/65
[58] Field of Search .......... 150/3; 24/30.5 R, 30.5 T, 24/30.5 P; 229/54 R, 54 C, 63, 65; 44/40; 110/241

[56] References Cited

U.S. PATENT DOCUMENTS

| | | | |
|---|---|---|---|
| 91,748 | 6/1869 | Jameson . | |
| 2,374,128 | 4/1945 | Pinckert . | |
| 2,565,754 | 8/1951 | Brady . | |
| 2,677,496 | 5/1954 | Maynes | 229/55 |
| 3,010,809 | 11/1961 | Peck | 44/40 |
| 3,490,507 | 1/1970 | Grashorn | 150/1 |
| 3,548,906 | 12/1970 | Murphy | 229/54 R |
| 3,874,034 | 4/1975 | Clayton | 24/30.5 P |

FOREIGN PATENT DOCUMENTS 620543  1/1927  France ..................... 150/3

Primary Examiner—Donald F. Norton
Attorney, Agent, or Firm—Donald J. Singer; Jacob N. Erlich

[57] ABSTRACT

An incinerator bag that is primarily utilized for the storing of and subsequent destruction of classified documents. The bag is made of a three-ply construction which includes an inner and outer ply or layer of inflammable material such as paper and a middle ply of nonflammable open mesh material bonded therebetween. The nonflammable material may be in the form of, for example, glass fiber, metal wire or a non-metallic non-burnable material such as NOMEX. In addition, a closure element having a handle incorporated therewith is removably attached to the bag for utilization in sealing the bag when the bag is to be transported.

3 Claims, 4 Drawing Figures

U.S. Patent     Dec. 23, 1980     4,240,363
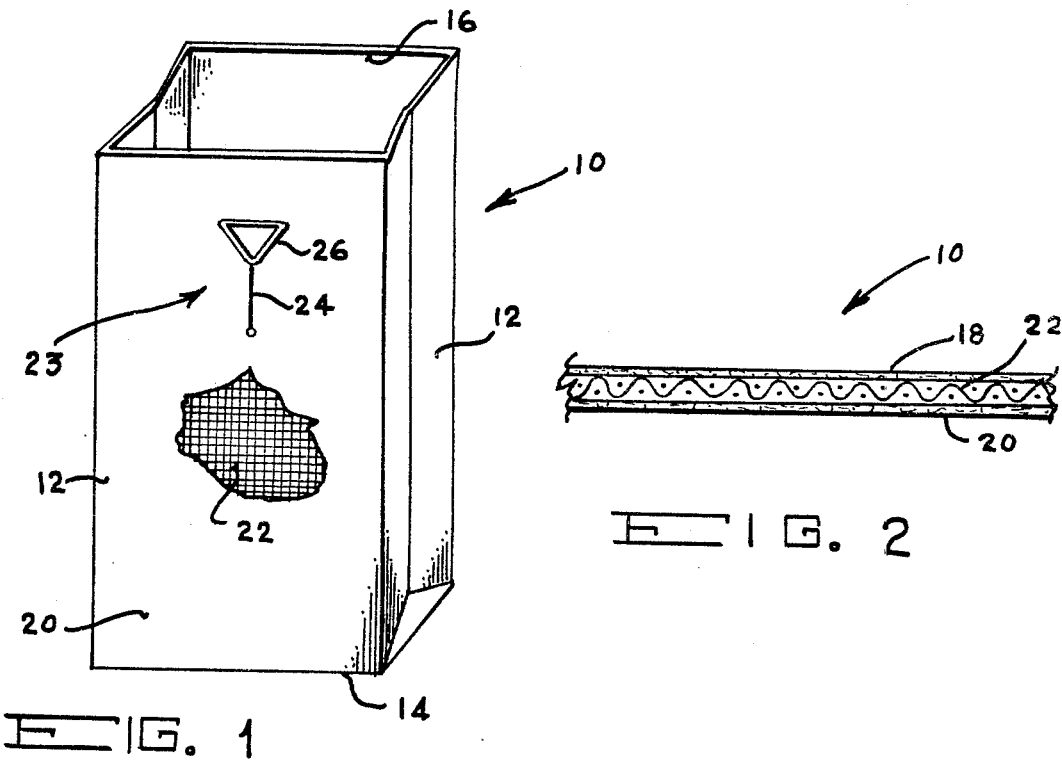
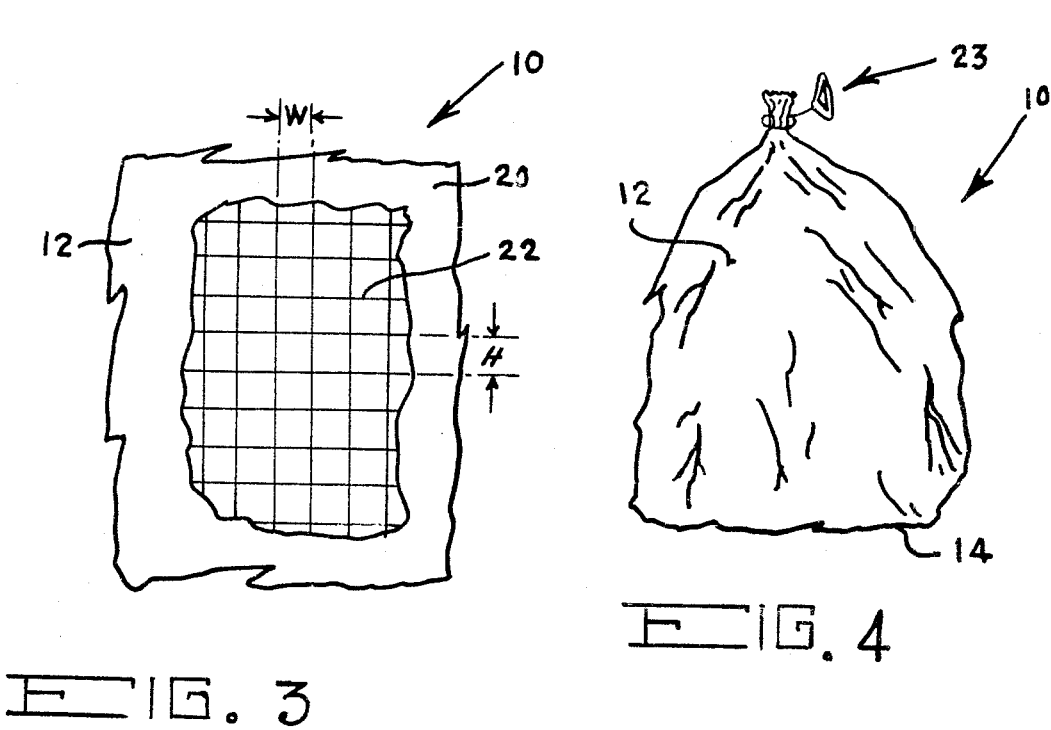

INCINERATOR BAG

STATEMENT OF GOVERNMENT INTEREST

The invention described herein may be manufactured and used by or for the Government for governmental purposes without the payment of any royalty thereon.

BACKGROUND OF THE INVENTION

This invention relates generally to storage bags, and, more particularly to an incinerator bag which is capable of containing therein articles such as classified documents which are to be destroyed by burning.

Generally, very little thought is given to containers for the emergency evacuation of classified documents. In the normal, routine destruction of classified documents, these documents are generally collected and deposited in ordinary "brown paper" grocery sacks. The sacks are then brought to a general incinerator where they are placed for subsequent burning. Normally the sacks will burn quickly, exposing the documents to the fire. The fire is then raked until only illegible ashes are left. This procedure, although acceptable, can be carried out only if preplanned and with sufficient time to remove the material and deposit them in the proper incinerator. In addition, it is essential to have proper supervision of the burning procedure in order to prevent the scattering about of readable-sized fragments of the documents.

For the emergency destruction of classified documents, however, very little planning and thought is given to the disposal of this classified material. One such procedure which is in effect today calls for the immediate evacuation of the documents into cardboard boxes or other such containers which are then placed in an improvised-type incinerator which may be manufactured out of, for example, 55 gallon metal drums. The burning of this classified material then takes place within the drums with no provision to prevent the escape of any readable fragments during the destruction thereof, as well as for the escape of burning fragments of material which may constitute a fire hazard.

Some of the other more obvious drawbacks to the plans instituted in the past are listed hereinbelow:

(a) present emergency plans fail to set forth what type of cardboard boxes are to be utilized in the disposal of the classified material;

(b) no provisions have been made as to the storage or distribution of these cardboard boxes; and (c) no provisions have been made for the acquisition or storage of the 55-gallon drums used for emergency incineration of classified documents.

It is therefore readily apparent that very little consideration has been given to the destruction of classified documents and materials, whether under the nonemergency or emergency conditions. However, with more and more utilization of such classified documents, it is essential to provide an easily obtainable, storable and reliable container which can be utilized in the safe destruction of such classified documents by burning.

SUMMARY OF THE INVENTION

The incinerator bag of this invention overcomes the problems set forth in detail hereinabove by providing a container which can be readily utilized for the reliable destruction of classified documents. It should be noted, however, that although the main utility of this particular invention resides in the destruction of classified documents, the incinerator bag described hereinbelow can also be utilized for the destruction of any other burnable material or articles which can be contained therein.

The incinerator bag of this invention is made of a three-ply construction, that is, an inner and outer layer of inflammable material and a middle layer of fireproof mesh or net. The size of the incinerator bag of this invention, although not limited thereto, is generally made so that it may be, in a folded condition, stored within a filing-cabinet-type safe or the like.

The inner and outer layers of material have sandwiched therebetween a mesh or net layer of material which is made of strands of a fireproof substance, such as wire mesh to form a plurality of approximately square openings about ¼ inch on each side. It is necessary that the openings formed within the mesh material be of such a size to allow the free access of air to the burning contents of the bag and yet prevent readable-sized fragments of the articles contained therein from scattering and escaping. This fireproof material may also be made of a glass fiber, or a fire resistant, nonmetallic material such as NOMEX. Removably attached to a side of the incinerator bag would be any conventional tie-type fastener having formed as part thereof a handle.

During non use, the incinerator bag is stored, in the folded condition, at the back of each drawer of a file-cabinet-type safe, and should be of a size sufficient to hold the contents of such a drawer. The bag would be long enough to be twisted shut when filled, and the neck secured with the wire, twist-tie attached to each bag.

If emergency evacuation became necessary, the documents in each drawer would be placed into the incinerator bag of this invention and stored until ready for destruction. Thus, in an emergency, the incinerator bag would be immediately useable. If it then became necessary to destroy the contents of the safe, that is, the classified documents, the bags would be stacked and set on fire. The inner and outer layer would burn away, leaving the mesh bag exposed, allowing air free access to the burning contents, allowing fast efficient incineration and keeping the readable-sized fragments from scattering and escaping.

It is therefore an object of this invention to provide an incinerator bag which can be utilized both as a container for emergency evacuation and subsequent incineration of the classified documents contained therein.

It is another object of this invention to provide an incinerator bag which can be easily stored, and be immediately ready for use.

It is another object of this invention to provide an incinerator bag in which the contents of the bag will be completely destroyed while keeping readable-sized fragments from scattering and escaping therefrom.

It is another object of this invention to provide an incinerator bag which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 1 is a pictorial representation of the incinerator bag of this invention showing a portion thereof in segmented fashion in order to clearly display the middle ply mesh construction of the bag;

FIG. 2 is a cross-sectional view of a side of the incinerator bag of this invention;

FIG. 3 is an exaggerated view, showing in segmented fashion, the middle ply of the three ply construction of a side of the incinerator bag of this invention; and FIG. 4 is a pictorial representation of the incinerator bag of this invention in its closed position with the closure-handle attached to the top portion thereof.

DETAILED DESCRIPTION OF THE PREFERRED EMBODIMENT

Reference is now made simultaneously to FIG. 1 of the drawing which best shows the entire incinerator bag 10 of this invention and to FIGS. 2 and 3 of the drawing which best illustrate the manner of construction of incinerator bag 10. Incinerator bag 10, although best utilized in the incineration of classified documents, is not limited thereto, and can be utilized whenever it is necessary to burn or dispose of materials. The bag itself is basically in the shape of any conventional "grocery-type" sack having a plurality of foldable sides 12 a bottom 14 and an open top 16. It is the unique construction of this incinerator bag 10 in which the inventive concept resides.

This construction is best illustrated in FIGS. 2 and 3 of the drawing. The basic bag construction is a three ply construction. Two of the plys, an inner ply 18 and an outer ply 20 are made of a material which can be easily burned, such as paper. Sandwiched between inner and outer plys 18 and 20 is a nonflammable or fireproof net mesh layer of material 22. The three plys 18, 20 and 22 are adhered together by any suitable securing means such as gluing. The middle ply 22, which is in the form of a fire proof mesh or net, can be made of any suitable material such as metal wire screen or a fire proof nonmetalic material such as Nomex.

It is essential for proper burning of the articles placed within the bag 10 that the mesh material 22 have each opening of the mesh made of a width, W, and height, H, sufficiently small to prevent any readable-sized fragments of the burned material from scattering and escaping from the bag during or after the burning procedures. For example, if the width, W, and the height, H, of each opening within the mesh is less than $\frac{1}{4}''$ in size, proper burning and subsequent disposal of the material placed within bag 10 can e obtained.

Attached to one side of bag 10 is a handle-closure element 23 made preferably of a wire-tie-type fastening element 24 having secured to one end thereof to a fireproof handle portion 26 made of aluminum or the like. The entire handle closure element 23 is adhered by any conventional securing means such as adhesive tape or staple to side 12 of bag 10 for usage in a manner described hereinbelow.

Although not limited to a particular size, it is preferred that bag 10 be of such a size that it can be easily stored, in the folded position, at the back of each drawer of, for example, a filing-cabinet-type safe. Therefore, dimensions such as 40" in height, 14" in width and 10" in depth would be a convenient size for bag 10. This size of incinerator bag 10 of this invention would be small enough to allow bag 10 to be stored properly within a safe and yet be large enough to contain the material from within the safe which is to be incinerated during emergency conditions.

If an emergency evacuation becomes necessary, the documents within each drawer of the safe would be placed within the incinerator bag 10 stored in that particular drawer. Thus, at the point of the emergency, bag 10 could be quickly utilized for transportation of classified documents from the safe to an appropriate area for destruction. In order to do so one must merely place the material to be disposed within bag 10, twist the top of the bag as shown in FIG. 4 of the drawing and attach thereto the handle-closure element 23 by twisting around the top of bag 10 the twist-tie element 24. The handle portion 26 remains extended for use by an individual in transporting bag 10. Incinerator bag 10 would then be stacked in a suitable pile and set on fire. After setting bag 10 on fire inner and outer layers or plys 18 and 20 quickly burn away exposing the mesh layer 22, which allows the free passage of air into the burning contents of bag 10. Therefore, quick incineration of the articles in bag 10 take place. The particular size mesh utilized as the middle ply 22, being of for example $\frac{1}{4}''$ square, prevents the readable-sized fragments of the documents being burned within bag 10 from scattering. Clearly, such an incinerator bag 10 as defined by the instant invention has great utility for the disposal of classified documents, yet can also be utilized for the burning of other material in which it is essential that the material within the bag be prevented from scattering about the area of incineration.

Although this invention has been described with reference to a particular embodiment, it will be understood to those skilled in the art that this invention is also capable of further and other embodiments within the spirit and scope of the appended claims.

I claim:

1. An incinerator bag utilized for reliably and safely destroying the contents of said bag comprising a foldable enclosure having an open top portion, said enclosure having a three ply construction, said three ply construction being in the form of an inner layer of inflammable material, an outer layer of inflammable material and a middle layer of nonflammable, fireproof mesh material sandwich between said inner and outer layers of material, said mesh material having openings therein of a preselected size, said preselected size being no greater than approximately $\frac{1}{4}$ inch square, and a closure element, said closure element being in the form of an elongated wire having a fireproof handle secured to one end thereof, said closure element being removably attached to said outer layer of material for securely closing said open top portion of said enclosure and simultaneously acting as a handle for transporting said incinerator bag whereby upon incineration of said bag, said inner and outer layers of material are destroyed permitting the incineration of said contents of said bag leaving only said nonflammable, fireproof mesh material to hold the burnt remains of said contents of said bag.

2. An incinerator bag as defined in claim 1 wherein said mesh material is in the form of a wire screen.

3. An incinerator bag as defined in claim 1 wherein said mesh material is in the form of a nonmetalic fireproof screen.

* * * * *